United States Patent
Koyama et al.

(10) Patent No.: US 10,079,099 B2
(45) Date of Patent: Sep. 18, 2018

(54) FILM CAPACITOR

(71) Applicant: Panasonic Intellectual Property Management Co., Ltd., Osaka (JP)

(72) Inventors: Yuki Koyama, Toyama (JP); Akihiro Ozaki, Toyama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 29 days.

(21) Appl. No.: 15/351,114

(22) Filed: Nov. 14, 2016

(65) Prior Publication Data

US 2017/0062134 A1    Mar. 2, 2017

Related U.S. Application Data

(63) Continuation of application No. PCT/JP2015/002559, filed on May 21, 2015.

(30) Foreign Application Priority Data

May 28, 2014    (JP) ................. 2014-109794

(51) Int. Cl.

| | |
|---|---|
| *H01G 4/20* | (2006.01) |
| *H01G 2/04* | (2006.01) |
| *H01G 2/08* | (2006.01) |
| *H01G 4/00* | (2006.01) |
| *H01G 4/258* | (2006.01) |
| *H01G 4/224* | (2006.01) |
| *H01G 4/228* | (2006.01) |
| *H01G 4/002* | (2006.01) |
| *H01G 4/005* | (2006.01) |

(Continued)

(52) U.S. Cl.
CPC ............... *H01G 4/258* (2013.01); *H01G 2/04* (2013.01); *H01G 2/08* (2013.01); *H01G 2/106* (2013.01); *H01G 4/002* (2013.01); *H01G 4/005* (2013.01); *H01G 4/224* (2013.01); *H01G 4/228* (2013.01); *H01G 4/33* (2013.01); *H01G 4/38* (2013.01)

(58) Field of Classification Search
CPC    H01G 4/258; H01G 2/04; H01G 2/08; H01G 2/106; H01G 4/002; H01G 4/005; H01G 4/224; H01G 4/228; H01G 4/33; H01G 4/38
USPC ......................................... 361/329
See application file for complete search history.

(56) References Cited

U.S. PATENT DOCUMENTS

2014/0286064 A1*    9/2014    Kamizuma ............ H01G 4/258
                                                                    363/123

FOREIGN PATENT DOCUMENTS

JP        2013-026586        2/2013

OTHER PUBLICATIONS

International Search Report of PCT application No. PCT/JP2015/002559 dated Aug. 4, 2015.

* cited by examiner

*Primary Examiner* — Michael P McFadden
(74) *Attorney, Agent, or Firm* — McDermott Will & Emery LLP

(57) ABSTRACT

A film capacitor includes: a capacitor element in which a metallikon electrode is formed at an end; a bus bar connected with the metallikon electrode; a case having a container for housing the capacitor element and the bus bar; a lid member which covers an opening of the container; and a heat conducting member disposed between the bus bar and the lid member. The lid member has a protrusion on a side (Continued)

facing the heat conducting member, the protrusion is in contact with the heat conducting member, and the heat conducting member is in contact with the bus bar.

6 Claims, 7 Drawing Sheets

(51) Int. Cl.
*H01G 4/33* (2006.01)
*H01G 4/38* (2006.01)
*H01G 2/10* (2006.01)

FILM CAPACITOR

RELATED APPLICATIONS

This application is a Continuation of International Application No. PCT/JP2015/002559, filed on May 21, 2015, which in turn claims priority from Japanese Patent Application No. 2014-109794, filed on May 28, 2014, the contents of all of which are incorporated herein by reference in their entireties.

TECHNICAL FIELD

The present invention relates to a film capacitor in which capacitor elements are housed inside a case.

BACKGROUND

In recent years, a film capacitor mounted on electric equipment, electronic equipment, industrial equipment, automobiles, or the like has been required to enhance reliability of the film capacitor by dissipating heat generated during charge and discharge.

For example, Unexamined Japanese Patent Publication No. 2013-26586 discloses a film capacitor which includes a plurality of capacitor elements and a bus bar connected to the capacitor elements. The film capacitor is provided with heat dissipation means disposed at a portion closest to a terminal for external connection that is provided at the bus bar, which is excellent in heat dissipation performance as compared with the other portions. The film capacitor is specifically described below.

FIG. 6 is a perspective view showing a configuration of a conventional film capacitor, and FIG. 7 is a plan view of the film capacitor in a state in which positive electrode bus bar 92A on an upper surface side is excluded. The film capacitor houses a plurality of capacitor elements 91, positive electrode bus bar 92A, and negative electrode bus bar 92B in case 93. Metallikon electrodes formed on both ends of each capacitor element 91 are respectively connected to positive electrode bus bar 92A and negative electrode bus bar 92B. Also, the conventional film capacitor is configured so that no capacitor element 91 is disposed at a portion closest to positive electrode external terminal 92A2, which is provided at positive electrode bus bar 92A for external connection, and negative electrode external terminal 92B2, which is provided at negative electrode bus bar 92B for external connection. The film capacitor is configured so that only mold resin 96 is disposed at the portion. Even when heat is conducted together with current applied from an input side to positive electrode external terminal 92A2 and negative electrode external terminal 92B2, this heat is first conducted to mold resin 96 before the heat is conducted to capacitor elements 91 from positive electrode external terminal 92A2 via positive electrode bus bar 92A and negative electrode external terminal 92B2 via negative electrode bus bar 92B, respectively. Accordingly, the heat can be dissipated from this mold resin 96 to outside. Hence, in the conventional film capacitor, large heat conduction which causes damage to capacity elements 91 can be suppressed.

In this way, heat generation can be suppressed to some extent in the conventional technique disclosed in Unexamined Japanese Patent Publication No. 2013-26586. However, a film capacitor further improved in heat dissipation performance has been required in recent years.

SUMMARY

A film capacitor includes: a capacitor element in which a metallikon electrode is formed at an end; a bus bar connected with the metallikon electrode; a case having a container for housing the capacitor element and the bus bar; a lid member which covers an opening of the container; and a heat conducting member disposed between the bus bar and the lid member. The lid member has a protrusion on a side facing the heat conducting member, the protrusion is in contact with the heat conducting member, and the heat conducting member is in contact with the bus bar.

A film capacitor whose reliability is enhanced by improving heat dissipation performance can be provided.

DESCRIPTION OF EMBODIMENT

Hereinafter, a configuration of a film capacitor in a first exemplary embodiment and a method for manufacturing the film capacitor are described with reference to the drawings.

Figure 1:
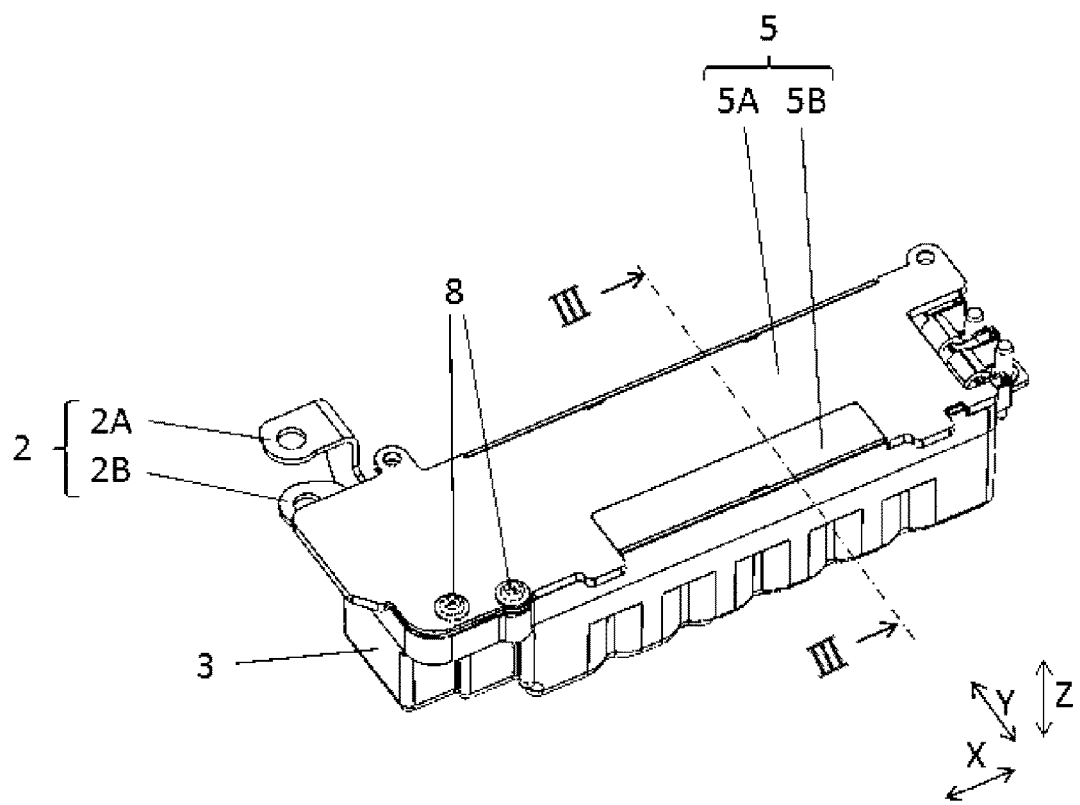
FIG. 1 is a perspective view of a film capacitor in a first exemplary embodiment.
Figure 2:
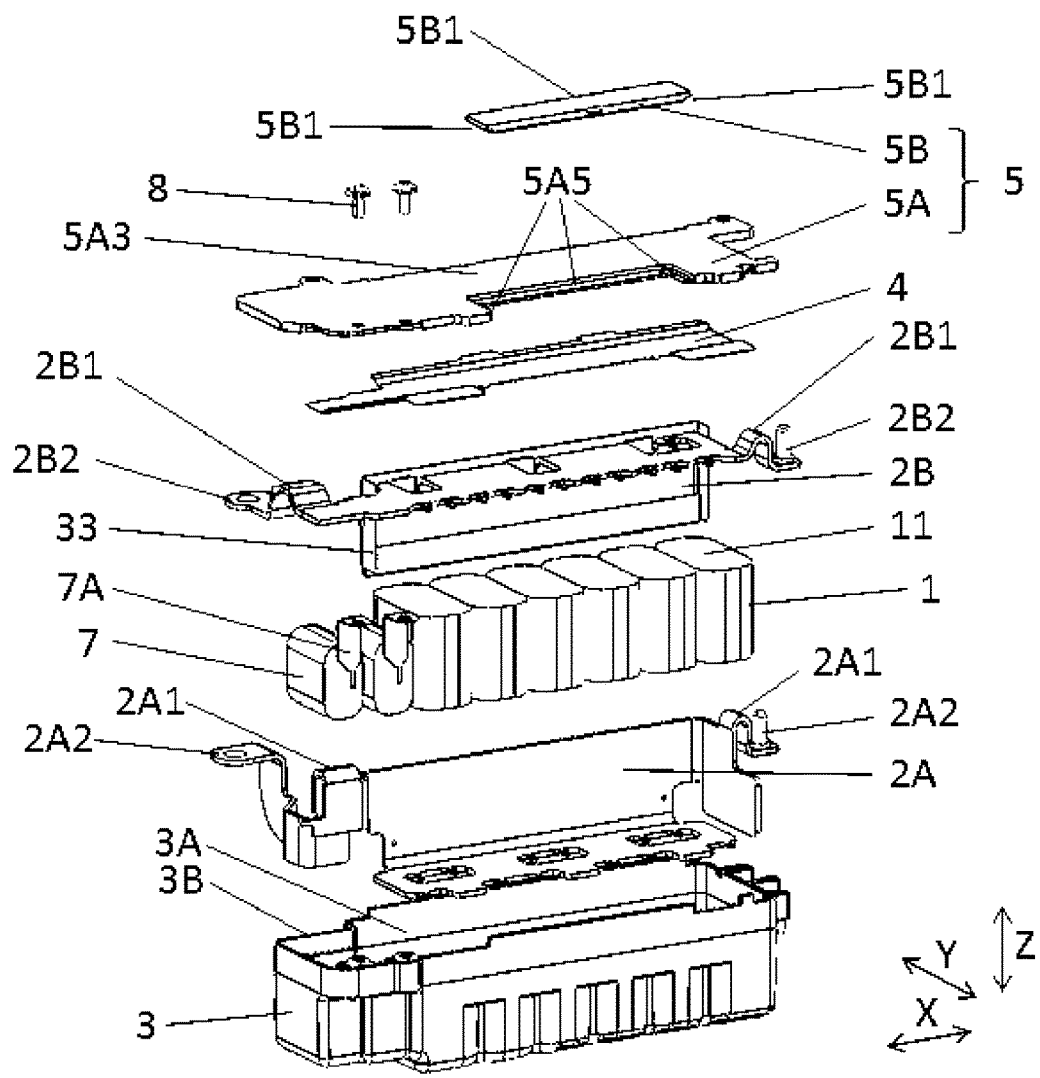
FIG. 2 is an exploded perspective view of the film capacitor in the first exemplary embodiment.
Figure 3:
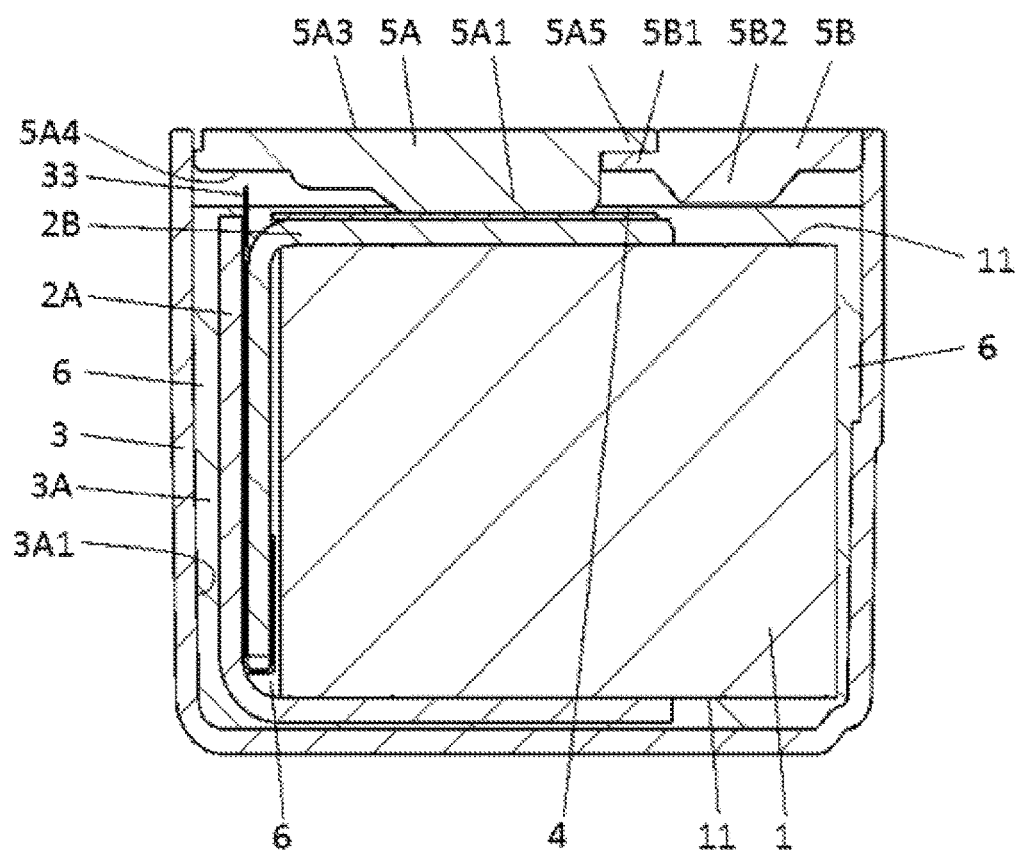
FIG. 3 is a sectional view of the film capacitor in the first exemplary embodiment.

FIG. 1 is a perspective view of the film capacitor according to the first exemplary embodiment, and FIG. 2 is an exploded perspective view of a main part of the film capacitor. Further, FIG. 3 is a sectional view taken along a cutting line III-III in FIG. 1.

In the present exemplary embodiment, the film capacitor includes six capacitor elements 1 for smoothing current. Both ends of each capacitor element 1 are formed with metallikon electrode 11. Here, a configuration of capacitor element 1 is described in detail. Capacitor element 1 has two end surfaces facing each other and a side surface connecting these two end surfaces. Capacitor element 1 is formed in a flat shape (a shape having two flat surfaces and two curved surfaces), as viewed from the end surface. Further, capacitor element 1 includes a pair of metallized films. The metallized film is a film in which a vapor-deposited metal layer (a vapor-deposited electrode) is formed by vapor-depositing aluminum on at least one of surfaces of a dielectric film formed of polypropylene (hereinafter referred to as "PP") or the like. Then, this pair of metallized films is overlapped and wound around (a winding body). Further, metallikon electrode 11 formed of zinc is formed on both end surfaces of the winding body.

For example, bus bar 2 made of metal, such as copper, is configured with positive electrode bus bar 2A and negative electrode bus bar 2B. Insulating paper 33 is attached to a surface of negative electrode bus bar 2B which opposes positive electrode bus bar 2A, thereby realizing insulation from positive electrode bus bar 2A. Positive electrode bus bar 2A is connected to one metallikon electrode 11 of each capacitor element 1 by soldering or resistance welding.

Negative electrode bus bar 2B is connected to other metallikon electrode 11 of each capacitor element 1 by soldering or resistance welding.

Plurality of capacitor elements 1, to which positive electrode bus bar 2A and negative electrode bus bar 2B are connected, are housed in container 3A provided in case 3 formed of an insulating resin, such as polyphenylene sulfide (hereinafter referred to as "PPS"). Case 3 is a top open type and has a substantially rectangular opening. Rectangular annular end surface 3B, which has a substantially rectangular shape, is formed in case 3 so as to surround the opening of container 3A.

Further, each of both ends of positive electrode bus bar 2A and each of both ends of negative electrode bus bar 2B in an arrangement direction (an X direction) of capacitor elements 1 are provided with holder 2A1 and holder 2B1, respectively. Holder 2A1 and holder 2B1 are hung at predetermined positions of rectangular annular end surface 3B of case 3. Also, heat conducting sheet 4 formed of an insulating paper or an acrylic resin is disposed on a surface (a heat conducting member disposing surface) on a side opposite to a surface of negative electrode bus bar 2B connected with metallikon electrode 11 (a metallikon electrode connecting surface). Heat conducting sheet 4 is in contact with negative electrode bus bar 2B. It is preferable that a thickness of heat conducting sheet 4 be small as long as there is no problem in insulation. For example, the sheet with a thickness ranging from 0.5 mm to 1.0 mm can be used. In the present exemplary embodiment, insulating paper in which polyamide paper is attached to a polyethylene terephthalate (PET) film is used as heat conducting sheet 4. The insulating paper is thin and excellent in handling ability. Heat conducting sheet 4 is an example of a heat conducting member.

For example, lid member 5 made of metal, such as aluminum, is disposed on rectangular annular end surface 3B of case 3 so as to cover the opening of container 3A of case 3. Lid member 5 is fixed to rectangular annular end surface 3B of case 3 by screws 8. Further, positive electrode external terminal 2A2 of positive electrode bus bar 2A is provided at a position further away from case 3 than holder 2A1 of positive electrode bus bar 2A. Similarly, negative electrode external terminal 2B2 of negative electrode bus bar 2B is provided at a position further away from case 3 than holder 2B1 of negative electrode bus bar 2B.

Figure 4:
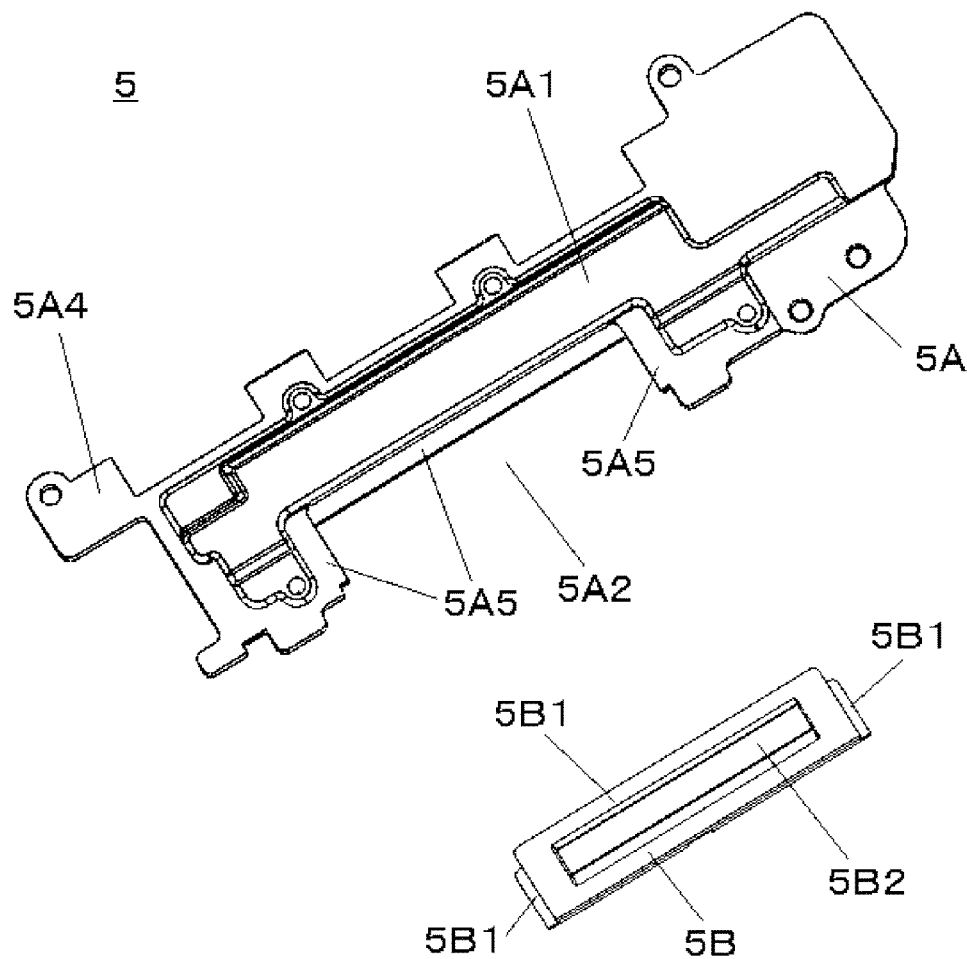
FIG. 4 is a perspective view of a state in which a first lid member and a second lid member in the first exemplary embodiment are separated.

Lid member 5 is configured with first lid member 5A and second lid member 5B. As shown in FIG. 2, first lid member 5A is larger than second lid member 5B. FIG. 4 is a perspective view of lid member 5 in a state in which first lid member 5A and second lid member 5B are separated, as viewed from heat conducting sheet 4 side. First lid member 5A has cut-away part 5A2. Step 5A5 is provided near three outer edges which configure cut-away part 5A2 of first lid member 5A. Further, step 5B1 is provided near three sides among four sides of rectangular second lid member 5B in a top view. Second lid member 5B is fixed by fitting steps 5B1 of second lid member 5B into steps 5A5 of first lid member 5A. Lid member 5 is configured by combining first lid member 5A and second lid member 5B.

As shown in FIG. 3, first lid member 5A has outer surface 5A3 configuring a surface of the film capacitor and inner surface 5A4 disposed on an opposite side of outer surface 5A3 which is facing container 3A of case 3. Inner surface 5A4 has protrusion 5A1. An end of protrusion 5A1 is in contact with heat conducting sheet 4. In other words, heat conducting sheet 4 is sandwiched between negative electrode bus bar 2B and lid member 5 (protrusion 5A1 of first lid member 5A). With this configuration, since heat generated from capacitor elements 1 is conducted to whole lid member 5 via metallikon electrode 11, bus bar 2, heat conducting sheet 4, and protrusion 5A1, the heat can be efficiently dissipated from the film capacitor to outside. Further, heat conducting sheet 4 does not affect electrical properties of the film capacitor because of having insulation. It should be noted that, a configuration in which an insulating resin is poured between negative electrode bus bar 2B and lid member 5 can be also considered as a configuration other than the present exemplary embodiment. However, in this case, a sufficient gap must be provided between negative electrode bus bar 2B and lid member 5 in order to pour the resin. In a case where the sufficient gap is provided in this way, heat dissipation is naturally reduced, and excellent heat dissipation as with the present exemplary embodiment cannot be realized. On the other hand, when the insulating paper in which the polyamide paper is attached to the thin PET film is used as with the present exemplary embodiment, a distance between negative electrode bus bar 2B and lid member 5 can be sufficiently small. Accordingly, excellent heat dissipation can be realized.

Further, two Y-capacitors 7 connected in parallel and adjacent to capacitor elements 1 on a left side on a paper surface in FIG. 2 are connected in series with capacitor elements 1. These two Y-capacitors 7 are disposed for removing noise.

Also, as shown in FIG. 3, resin layer 6 for sealing capacitor element 1 is formed in a space demarcated by the inner surface of lid member 5 facing container 3A of case 3 and by surface 3A1 of container 3A of case 3, except for a top of the space. Resin layer 6 fully covers heat conducting sheet 4, and further, an end on heat conducting sheet 4 side of protrusion 5A1 is embedded in resin layer 6.

However, according to the present exemplary embodiment, the end portion (a lower end portion) of side surfaces of protrusion 5A1 of first lid member 5A is covered with (embedded in) resin layer 6 at heat conducting sheet 4 side. Accordingly, first lid member 5A can be fixed reliably and firmly in a state in which first lid member 5A is in contact with heat conducting sheet 4 by an anchor effect of protrusion 5A1 and resin layer 6. Further, as shown in FIGS. 1 and 2 in the present exemplary embodiment, first lid member 5A is fixed to rectangular annular end surface 3B of case 3 by two screws 8, and screws 8 are fastened, in proximity to each other, only to one side of rectangular annular end surface 3B. This is due to a request for miniaturization of the film capacitor. Because of this, first lid member 5A is fixed on one side instead of being fixed on both sides where sides facing to each other are fixed on rectangular annular end surface 3B. First lid member 5A is essentially in a state similar to one-point fixing instead of two-point fixing with regard to a Y direction perpendicular to the X direction. However, even when first lid member 5A and case 3 are fixed as described above, since the end at heat conducting sheet 4 side of protrusion 5A1 is embedded in resin layer 6 in a state of being in contact with heat conducting sheet 4, stability of the contact between protrusion 5A1 and heat conducting sheet 4 can be enhanced. Moreover, in the present exemplary embodiment, even when force directed to an upper side in a Z direction is applied to inner surface 5A4 disposed on a deep side on the paper surface in the Y direction of first lid member 5A, the end at heat conducting sheet 4 side of protrusion 5A1 is embedded in resin layer 6 in the state of being in contact with heat conducting sheet 4. Accordingly, stability of the contact between protrusion 5A1 and heat conducting sheet 4 can be enhanced.

In a case where the film capacitor is incorporated in an inverter circuit for driving a motor (particularly, a train, in-vehicle use), since charging and discharging is performed by large current, heat is more easily generated from the film capacitor. Therefore, a highly reliable film capacitor can be provided by using the film capacitor of the present exemplary embodiment for such a use.

(Manufacturing Method)

A method for manufacturing the film capacitor of the present exemplary embodiment is described below.

(Capacitor Element Forming Process)

A capacitor element forming process is described. First, aluminum is vapor-deposited on one surface of the dielectric film formed of PP, thereby forming the metallized film formed with the vapor-deposited metal layer (the vapor-deposited electrode). It should be noted that the aluminum is used as the vapor-deposited metal in the present exemplary embodiment. However, a metal, such as zinc or magnesium, or a combination of these metals may be used other than the aluminum.

Next, the metalized film for one polarity and the metalized film for another polarity are overlapped and wound around in a state in which ends in a width direction are slightly shifted. Accordingly, the cylindrical winding body is manufactured. Then, a curved outer peripheral surface of this winding body is pressed from both sides in a radial direction of the winding body to form the winding body into the flat shape (the shape having the two flat surfaces and the two curved surfaces). Moreover, metallikon electrode 11 is formed by spraying the zinc on the two end surfaces that face each other of the winding body formed into the flat shape. With this configuration, capacitor element 1, in which the vapor-deposited metal layers that face via the dielectric film are connected to metallikon electrode 11, is completed.

(Bus Bar Connecting Process)

First, negative electrode bus bar 2B, positive electrode bus bar 2A, Y-capacitor 7, and GND terminal 7A are prepared. Insulating paper 33 is attached to the surface of negative electrode bus bar 2B which opposes positive electrode bus bar 2A to realize insulation from positive electrode bus bar 2A. Next, positive electrode bus bar 2A is connected to one metallikon electrode 11 of each of six capacitor elements 1 by soldering or resistance welding, and negative electrode bus bar 2B is connected to other metallikon electrode 11 of the capacitor element by soldering or resistance welding. Further, one metallikon electrode 11 of Y-capacitor 7 and one end of GND terminal 7A are connected by the soldering or the resistance welding, and the other metallikon electrode of Y-capacitor 7 and positive electrode bus bar 2A are connected by the soldering or the resistance welding.

(Sealing Process)

First, top open type case 3 made of PPS including container 3A is prepared. Case 3 has rectangular annular end surface 3B formed in the substantially rectangular shape so as to surround the opening of container 3A.

Holders 2A1 are respectively provided at the ends of positive electrode bus bar 2A in the arrangement direction (the X direction) of the capacitor elements. Holders 2B1 are respectively provided at the ends of negative electrode bus bar 2B in the arrangement direction of the capacitor elements. Holders 2A1 and holders 2B1 are mounted so as to hang at the predetermined positions of rectangular annular end surface 3B of case 3. Six capacitor elements 1 and two Y-capacitors 7, to which positive electrode bus bar 2A and negative electrode bus bar 2B are connected, are housed in container 3A of case 3. At this time, another end of GND terminal 7A connected to the one metallikon electrode of Y-capacitor 7 is also in contact with rectangular annular end surface 3B so that a through-hole of the GND terminal overlaps with a screw hole provided on rectangular annular end surface 3B.

Next, heat conducting sheet 4 formed of the insulating paper or the acrylic resin is disposed on the disposing surface for heat conducting member which is on the side opposite to the metallikon electrode connecting surface of negative electrode bus bar 2B. Next, first lid member 5A formed of a metal, such as aluminum, is disposed on rectangular annular end surface 3B of case 3 so as to cover the opening of container 3A of case 3. Also, protrusion 5A1 provided in first lid member 5A on a side opposite to heat conducting sheet 4 is brought into contact with heat conducting sheet 4. Then, first lid member 5A and GND terminal 7A are fixed to case 3 by using nuts embedded in case 3 and screws 8. It should be noted that positive electrode external terminal 2A2 of positive electrode bus bar 2A and negative electrode external terminal 2B2 of negative electrode bus bar 2B are exposed to outside of case 3 and first lid member 5A.

Figure 5:
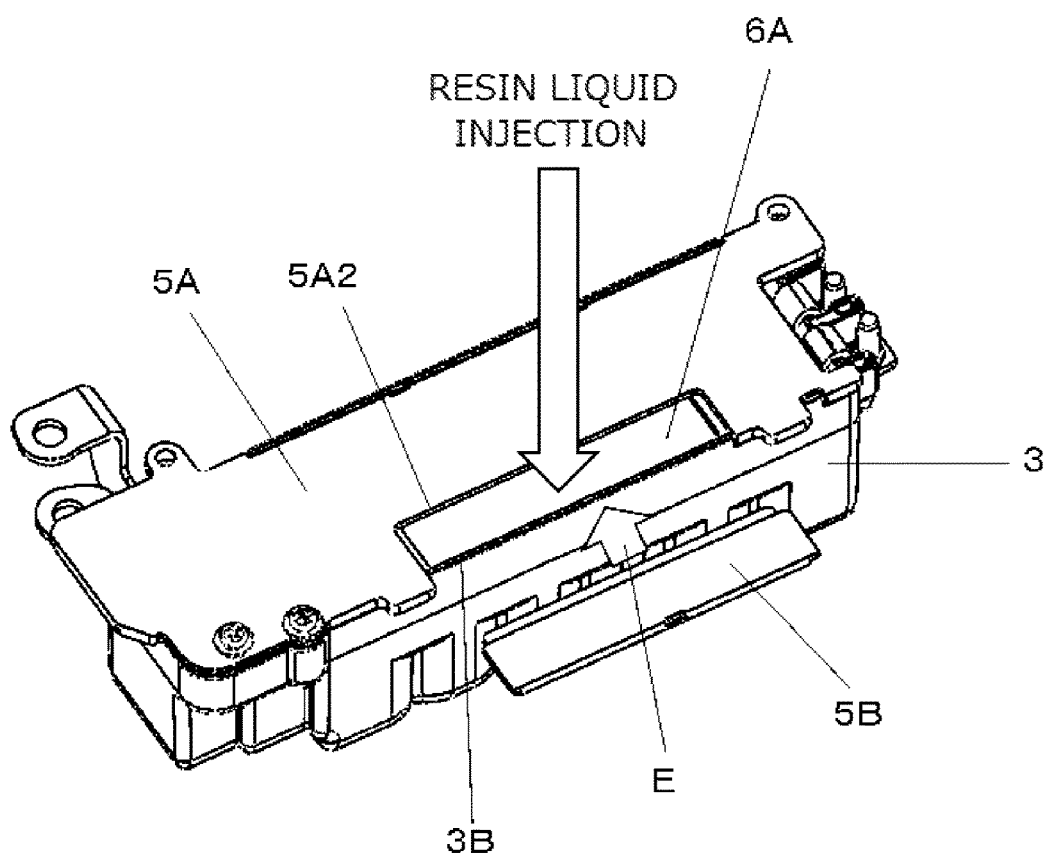
FIG. 5 is a schematic perspective view explaining resin liquid injection in the first exemplary embodiment.
Figure 6:
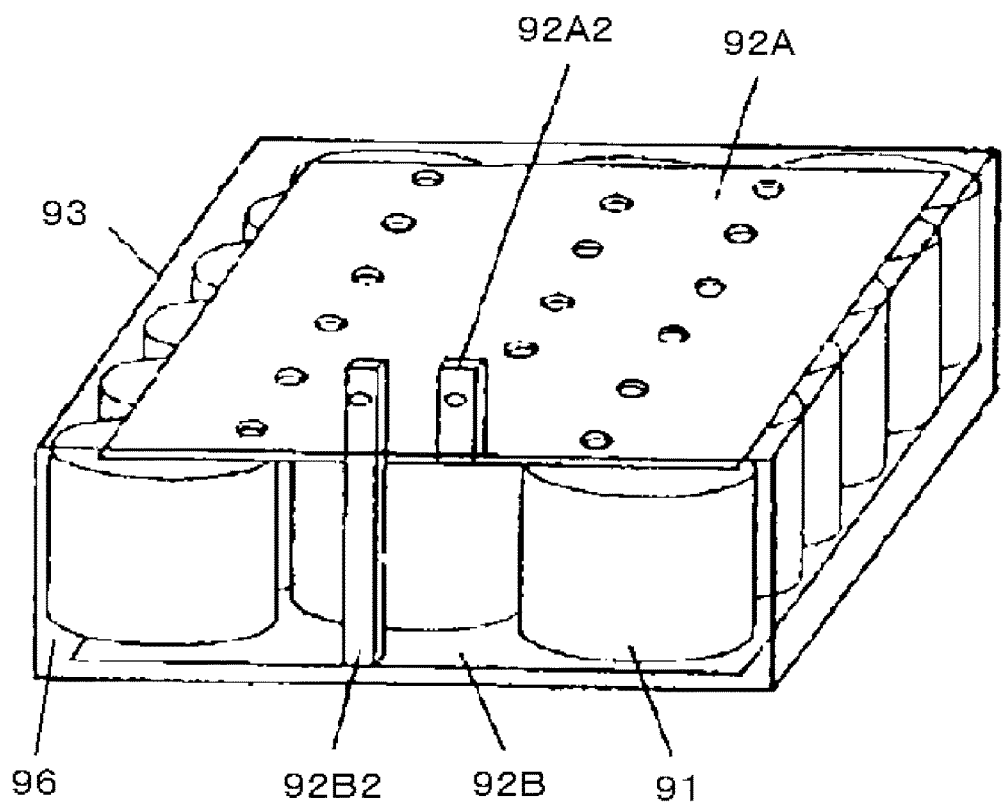
FIG. 6 is a perspective view of a conventional film capacitor.
Figure 7:
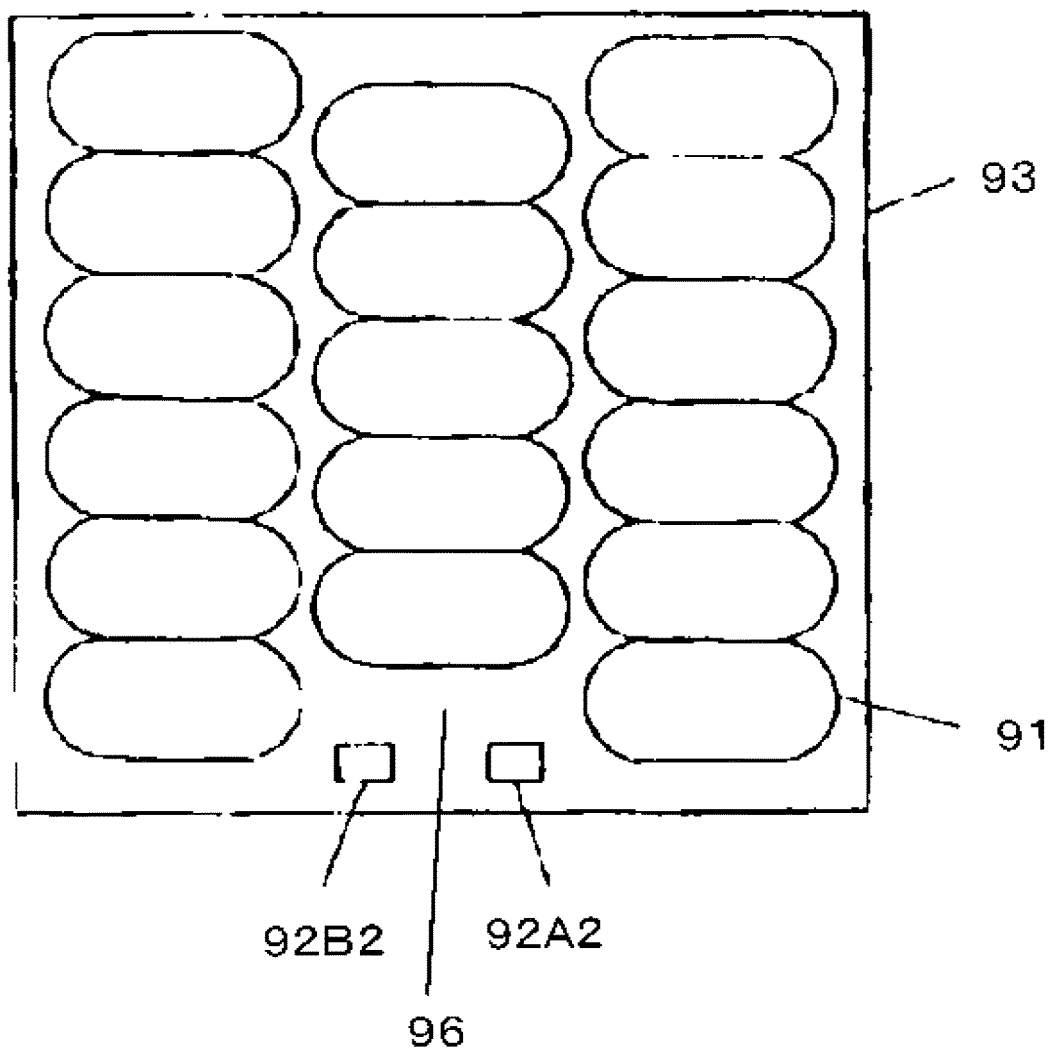
FIG. 7 is a plan view of a state in which a positive electrode bus bar on an upper surface side of the conventional film capacitor is excluded.

FIG. 5 is a schematic perspective view explaining resin liquid injection for forming resin layer 6 for sealing the capacitor elements. In order to facilitate understanding, members, such as capacitor elements 1 housed in container 3A of case 3, are omitted. As shown in FIG. 5, the resin liquid of high temperature is injected to container 3A from opening (a resin liquid injection opening) 6A formed with a part of rectangular annular end surface 3B of case 3 and cut-away part 5A2 of first lid member 5A. As shown in FIG. 3, the gap between surface 3A1 of container 3A of case 3 and capacitor element 1, bus bar 2, or the like is filled with the resin liquid. The resin liquid is cooled, thereby forming resin layer 6. Resin layer 6 entirely covers heat conducting sheet 4 and at least covers the end on heat conducting sheet 4 side of protrusion 5A1. In other words, protrusion 5A1 of first lid member 5A has a portion embedded in resin layer 6.

Next, as shown by arrow E in FIG. 5, steps 5B1 of second lid member 5B are fit into steps 5A5 provided at cut-away part 5A2 of first lid member 5A so as to seal resin liquid injection opening 6A with second lid member 5B. Second lid member 5B is fixed, thereby completing the film capacitor of the present exemplary embodiment.

According to the present exemplary embodiment, lid member 5 is configured by dividing lid member 5 into first lid member 5A and second lid member 5B. Consequently, when resin layer 6 is formed, resin liquid injection opening 6A can be provided by the opening formed with a part of rectangular annular end surface 3B of case 3 and cut-away part 5A2 of first lid member 5A, thereby having an effect of injecting the resin liquid efficiently. Further, since resin liquid injection opening 6A can be closed by fixing second lid member 5B to case 3, moisture resistance can be improved. Further, since second lid member 5B functions as a heat dissipation member, the heat conducted from capacitor elements 1 can be efficiently dissipated by second lid member 5B.

Further, in the present exemplary embodiment, second lid member 5B has protrusion 5B2 protruding on capacitor elements 1 side, and protrusion 5B2 of second lid member 5B is disposed closer to resin layer 6 than steps 5B 1 of second lid member 5B. With this configuration, in the present exemplary embodiment, the heat conducted from capacitor elements 1 can be dissipated more efficiently by protrusion 5B2 of second lid member 5B.

It should be noted that, since second lid member 5B is disposed at a center portion in a longitudinal direction of the opening of container 3A, the gap formed between surface 3A1 of container 3A of case 3 and capacitor element 1 or bus bar 2 can be filled with the injected resin liquid efficiently and reliably.

In the present exemplary embodiment, the heat conducting member is configured by the one heat conducting sheet. However, the present invention is not limited to this. For example, a member formed by stacking two heat conducting sheets of the same material may be used. Further, components having different materials/shapes, for example, a member formed by stacking one insulating paper and one metal plate, or a member formed by stacking one insulating paper and one acrylic resin plate also belong to a technical scope of the heat conducting member of the present invention.

A film capacitor further improved in heat dissipation performance can be provided.

The film capacitor according to the present invention can improve the heat dissipation performance. Therefore, the film capacitor can be suitably employed as a film capacitor dedicated to a hybrid vehicle used under a harsh external environment.

What is claimed is:

1. A film capacitor comprising:
   a capacitor element in which a metallikon electrode is formed at an end;
   a bus bar connected with the metallikon electrode;
   a case having a container for housing the capacitor element and the bus bar;
   a lid member which covers an opening of the container; and
   a heat conducting member disposed between the bus bar and the lid member, wherein
   the lid member has a protrusion on a side facing the heat conducting member, the protrusion is in contact with the heat conducting member, and the heat conducting member is in contact with the bus bar.

2. The film capacitor according to claim 1, wherein
   a resin layer for sealing the capacitor element that the bus bar is connected to is formed inside the container, and
   the lid member is configured with a first lid member including the protrusion and a second lid member, and the first lid member and the second lid member cover the opening of the container.

3. The film capacitor according to claim 2, wherein the protrusion has a portion embedded in the resin layer.

4. The film capacitor according to claim 2, wherein the second lid member is provided at a center portion in a longitudinal direction of the opening.

5. The film capacitor according to claim 1, wherein the lid member and the protrusion are integrated.

6. The film capacitor according to claim 1, wherein the heat conducting member is sandwiched between the protrusion and the bus bar.

* * * * *